United States Patent Office 3,437,595
Patented Apr. 8, 1969

3,437,595
PROCESS FOR THE PRODUCTION OF OVERBASED ALKYL PHENATES SUITABLE FOR USE IN LUBRICANT ADDITIVES
Keith Coupland, Hull, England, assignor, by mesne assignments, to Orobis Limited, London, England, a British company
No Drawing. Filed Oct. 5, 1966, Ser. No. 584,352
Claims priority, application Great Britain, Oct. 29, 1965, 45,788/65
Int. Cl. C10m 3/32, 3/48; C07g 17/00
U.S. Cl. 252—42.7                                    13 Claims

ABSTRACT OF THE DISCLOSURE

A process is provided for making basic lubricant additives by reacting sulphur and an alkylphenol in the presence of a basic catalyst, followed by the addition in order of an alkaline earth metal compound, a vicinal glycol and carbon dioxide, then distilling off unreacted glycol. The process has advantages over other processes for making basic additives in that more glycol is recovered and additives of higher base number and lower viscosity are obtained.

---

The present invention relates to lubricant additives and in particular to basic lubricant additives.

In British specification 900,059 there is described a process for the production of a basic lubricant additive which coprises heating a mixture of a lubricating oil and a sulphurised alkaline earth metal alkylphenate with carbon dioxide and reacting the product with an alkaline earth metal hydroxide in the presence of a vicinal glycol. The vicinal glycol is then removed from the product by distillation under reduced pressure.

The vicinal glycol used in the process is preferably a 1,2-diol and more preferably it is ethylene glycol. The recovery of the unwanted glycol from the additive after reaction is desirable both for economic reasons and because the presence of the glycol may give the additive undesirable characteristics.

In practice the recovery of the glycol according to the process of British specification 900,059 is slow and incomplete, so that only 50–70% of the ethylene glycol used in the process is recovered. It is an object of the present invention to provide a process for the production of basic lubricant additives in which the glycol is recovered more efficiently.

Accordingly the present invention provides an improved process for the production of basic lubricant additives wherein an alkylphenol and sulphur are heated together in the presence of a catalyst, thereafter the sulphurised product is admixed with an alkaline earth metal oxide, alkoxide, or hydroxide, vicinal glycol and carbon dioxide, and the glycol is recovered from the final product by distillation.

Suitable alkylphenols include, for example dodecyl phenol.

Preferably the reaction of sulphur and alkylphenol is effected in the presence as catalyst of an oxide, alkoxide, hydroxide or sulphide of an element in Group I–A or Group II–A of the Periodic Table. It is particularly preferred to use an alkali metal hydroxide, especially sodium hydroxide, as catalyst. The catalyst may be added as an aqueous solution.

It may be desired to remove the metal of Group I–A or II–A from the reaction mixture before the second stage of the reaction is carried out. This may be done by adding an acid to form a salt which is insoluble in the reaction mixture. For example, when sodium hydroxide is used as catalyst, the sodium may be removed by adding phosphoric acid and separating sodium phosphate.

The reaction mixture may be heated during this first stage to 120° to 250° C. Little reaction takes place below 120° C. and whilst the reaction can be carried out above 250° C., dark and viscous products result. However the preferred range is 160° to 175° C.

In the second stage of the process of the present invention addition of the alkaline earth metal oxide, alkoxide or hydroxide to the sulphurised alkylphenol is preferably carried out after cessation of evolution of hydrogen sulphide, and is preferably added in the form of a slurry with diluent oil, for example, 100 Solvent Neutral. It may be desired to add with the diluent oil a defoamant additive, for example a polymethylsiloxane, a dispersant for the neutralising earth, such as an alkaline earth petroleum sulphonate, and a further low viscosity diluent to aid processing. The low viscosity diluent may suitably be a $C_{10}$–$C_{15}$ alcohol such as tridecanol.

The neutralising alkaline earth metal oxide, alkoxide or hydroxide is preferably calcium hydroxide or barium oxide.

During the second stage the reaction mixture may be heated to 80° to 180° C., preferably 140° to 160° C.

The vicinal glycol, which may suitably be a 1,2 diol such as ethylene glycol, or propylene-1,2-glycol, is preferably added dropwise under reduced pressure, after addition of the slurry. A suitable pressure for this addition is in the range 200–300 mm. Hg. At this stage it is preferable to distil off water from the reaction mixture suitably until the kettle temperature reaches about 150–155° C.

Carbon dioxide is thereafter added, suitably by blowing in under pressure, the required amount being that sufficient to give a carbon dioxide content in the final product of between 3.0 and 7.0%, and preferably between 3.5 and 5.0% when the alkaline earth used is calcium hydroxide. This corresponds to a carbon dioxide absorption of about 0.3 to 0.7 mole per mole of alkaline earth used. Undesired glycol and other low boiling components are then removed from the final reaction product by distillation under reduced pressure, which may be carried on until the kettle temperature rises above 200° C.

It has been found that when the vicinal glycol used is ethylene glycol, more than 90% of the ethylene glycol is recovered during the last stage of the process.

A further advantage of the additives obtained by the present invention is that they have unusually high basicities in view of their viscosities. Usually when the basicity of an additive is increased, for example by adding more lime to the composition than the stoichiometric proportion required to give a neutral salt of the sulphurised alkylphenol, a small increase in basicity is accompanied by considerable increase in viscosity. This increase in viscosity makes the additive more difficult to handle. Thus the present process may be used to give an additive having a higher base number than additives of the same viscosity obtained by prior processes.

The invention is further illustrated by the following examples.

Example 1 is according to the process of British specification 900,059 and is inserted for comparative purposes.

Example 1

| | | |
|---|---|---|
| Alkylphenol (Hydroxyl No. 195–200) | g | 210 |
| Calcium hydroxide | g | 110 |
| Sulphur | g | 39 |
| Calcium petroleum sulphonate | g | 24 |
| Tridecanol | ml | 35 |
| Diluent oil | ml | 240 |
| Antifoam DC 200 | g | .015 | were heated together to 130–135° C. Ethylene glycol (75 ml.) was added over 15 min., and the resulting mixture was kept at 130° C. and 200–300 mm. Hg pressure for a further 1 h. while water of reaction was removed by distillation.

The kettle temperature was then allowed to rise to 150° C. and the pressure was adjusted to atmospheric. Carbon dioxide was passed through the mixture until a total of 30 g. had been consumed. The pressure was lowered to 15 mm. Hg and the temperature of the mixture allowed to rise to 190–195° C. over 2 h., during which time the ethylene glycol and tridecanol distilled out. The product was then filtered hot.

Example 2

| | Grams |
|---|---|
| Alkylphenol (Hydroxyl No. 195–200) | 193 |
| Sulphur | 27.5 |
| Sodium hydroxide dissolved in 10 ml. water | 4.6 | were heated to a temperature of 160° C. The temperature of the mixture was then ollowed to rise to 170–175° C., and the pressure reduced to 200–300 mm. Hg for 1 hr. After this reaction time, the temperature was lowered to 140° C. and a slurry comprising:

| | | |
|---|---|---|
| Calcium hydroxide | g__ | 92 |
| Tridecanol | ml__ | 35 |
| Diluent oil | ml__ | 240 |
| Calcium petroleum sulphonate | g__ | 24 |
| Antifoam DC 200 | g__ | .015 | added. Whilst maintaining the temperature at 140° C. and the pressure at 200–300 mm. Hg, ethylene glycol (75 ml.) was added over a period of 15 minutes. The kettle temperature was then allowed to rise to 150° C. and the water of reaction removed by distillation. After the completion of water removal, the pressure was adjusted to atmospheric and the mixture "carbonated" by blowing into it 30 g. of carbon dioxide. The preparation was completed in a similar manner to Example 1.

Example 3

The processing is exactly the same as in Example 2. The initial reaction charge comprises:

| | | |
|---|---|---|
| Alkylphenol (Hydroxyl No. 195–200) | g__ | 210 |
| Sulphur | g__ | 30 |
| NaOH in 10 ml. water | g__ | 5 | and the added slurry comprises:

| | | |
|---|---|---|
| Calcium hydroxide | g__ | 100 |
| Tridecanol | ml__ | 35 |
| Diluent oil | ml__ | 240 |
| Calcium petroleum sulphonate | g__ | 24 |
| Antifoam DC 200 | g__ | .015 |

All other details are the same as Example 2.

TABLE

| | Test method | Ex. 1 | Ex. 2 | Ex. 3 |
|---|---|---|---|---|
| Calcium (Percent) | | 9.42 | 9.17 | 9.75 |
| Base No. (mg. KOH/g.) | | 255 | 252 | 273 |
| Sulphur (Percent) | | 3.99 | 3.31 | 3.40 |
| Viscosity at 210° F. (cps.) | ASTM D446 | 260.7 | 109 | 244 |
| $CO_2$ (Percent) | | 4.6 | 3.8 | 4.37 |
| Colour (ASTM units) | ASTM D1500 | 5.0 | 2.5 | 3 |
| Glycol recovery (Percent) | | 50 | 95 | 95 |

Example 4

The processing is the same as in Example 2. The initial reaction charge comprises:

| | | |
|---|---|---|
| Alkylphenol (Hydoxyl No. 195–200) | g__ | 210 |
| Sulphur | g__ | 30 |
| NaOH in 10 ml. water | g__ | 5 |

The added slurry comprises:

| | | |
|---|---|---|
| Barium oxide | g__ | 150 |
| Tridecanol | ml__ | 35 |
| Diluent oil | ml__ | 240 |
| Calcium petroleum sulphonate | g__ | 24 |
| Antifoam DC 200 | g__ | 0.015 |

All other details are the same as Example 2, except that carbon dioxide was passed into the mixture only until 23 g. were absorbed. The product contained 17.3% of barium and has a base number of 196 (mg. KOH/g.).

Example 5

Alkylphenol (1050 g.) was reacted with sulphur (50 g.) using as catalyst 25 g. of sodium hydroxide dissolved in a minimum amount of water. The reaction was carried out at 150° C. until evolution of hydrogen sulphide ceased. The sodium hydroxide was then neutralised by the addition of an equivalent amount (30 ml.) of phosphoric acid, resulting in the separation of sodium phosphate. The sulphurised alkylphenol was then filtered. The sodium content of the filtrate as measured by flame photometry was found to be less than 0.02%. 282 g. of the filtered sulphurised alkylphenol was mixed with 300 ml. of diluent oil, 135 g. of lime, 30 g. of a calcium petroleum sulphonate, 40 ml. of tridecanol and 10 parts per million of foam inhibitor. The reaction mixture was heated to 140° C. at 200 mm. pressure and 90 ml. ethylene glycol were slowly added. Water was stripped from the system and the temperature was raised to 160° C. over a period of 1½ hours. The mixture was then carbonated with 37 g. of carbon dioxide at atmospheric pressure. The product was stripped at 195–200° C. and 5 mm. pressure for 2 hours and filtered hot. The finished product had a calcium content of 9.63% and a sodium content of less than 0.02%.

I claim:

1. A process for the production of basic lubricant additives wherein (i) an alkylphenol and sulphur are heated together in a molar ratio of alkylphenol to sulphur in the range of 1:1 to 2.5:1 at a temperature in the range of 120°–250° C. in the presence of a catalyst which is an oxide, alkoxide, hydroxide or sulphide of an element of Group I-A of the Periodic Table (ii) the sulphurised product is reacted with an alkaline earth metal oxide, alkoxide, or hydroxide added at a temperature of 80°–180° C., (iii) vicinal glycol is added to the reaction mixture, (iv) carbon dioxide is added to the reaction mixture until between 0.3 and 0.7 mole per mole of alkaline earth metal used are absorbed and (v) unreacted glycol is recovered from the final product by distillation.

2. The process according to claim 1 wherein the alkylphenol is dodecyl phenol.

3. The process according to claim 1 wherein the catalyst is removed from the reaction mixture prior to the addition of the alkaline earth metal oxide, alkoxide or hydroxide.

4. The process according to claim 1 wherein the catalyst is removed from the reaction mixture by the addition of an acid to form a salt which is insoluble in the reaction mixture.

5. The process according to claim 1 wherein the alkaline earth metal oxide, alkoxide or hydroxide is calcium hydroxide or barium oxide.

6. The process according to claim 1 wherein the addition of the alkaline earth metal oxide, alkoxide or hydroxide is carried out after the cessation of evolution of hydrogen sulphide.

7. The process according to claim 1 wherein the alkaline earth metal oxide, alkoxide, or hydroxide is added in the form of a slurry with a diluent oil.

8. The process according to claim 1 wherein the vicinal glycol is ethylene glycol or propylene-1,2-diol.

9. The process according to claim 1 wherein the vicinal glycol is added at a pressure in the range 200 to 300 mm. Hg.

10. The process according to claim 1 wherein water is distilled from the reaction mixture as the vicinal glycol is added.

11. The process according to claim 1 wherein glycol and other low boiling components of the reaction mixture are removed by distilling the mixture under reduced pressure until the kettle temperature rises above 200° C.

12. A process for the production of basic lubricant additives wherein dodecyl phenol, sulphur and sodium hydroxide are heated at a temperature in the range 120° to 250° C., the sodium is removed by addition of phosphoric acid and separation of sodium phosphate, calcium hydroxide is added after the cessation of evolution of hydrogen sulphide in a slurry with a diluent oil at a temperature in the range 80 to 180° C., ethylene glycol is added under reduced pressure whilst water is distilled off, carbon dioxide is added in an amount sufficient to give a carbon dioxide content in the final product of between 3.0 and 7.0% and the ethylene glycol is recovered from the product by distillation.

13. A basic lubricant additive of higher base number than prior additives of like viscosity produced according to the process of claim 1 by heating together an alkylphenol and sulphur in a molar ratio of alkylphenol to sulphur in the range of 1:1 to 2.5:1 at a temperature in the range of 120°–250° C. in the presence of a catalyst which is an oxide, alkoxide, hydroxide or sulphide of an element of Group I-A of the Periodic Table, reacting the sulphurised produce with an alkaline earth metal oxide, alkoxide or hydroxide added at a temperature of 80°–180° C., adding vicinal glycol to the reaction mixture, adding carbon dioxide to the reaction mixture until between 0.3 and 0.7 mole per mole of alkaline earth metal used are absorbed and distilling the resulting product to remove unreacted glycol.

References Cited

UNITED STATES PATENTS

| | | | |
|---|---|---|---|
| 3,178,368 | 4/1965 | Hanneman | 252—18 XR |
| 3,194,761 | 7/1965 | Fox et al. | 252—42.7 |
| 3,242,078 | 3/1966 | Lynch | 252—18 |
| 3,336,224 | 8/1967 | Allphin | 252—18 XR |

FOREIGN PATENTS 900,059    7/1962    Great Britain.

PATRICK P. GARVIN, *Primary Examiner.*

U.S. Cl. X.R.

260—137, 609